(12) United States Patent
Kondapi et al.

(10) Patent No.: US 11,093,256 B2
(45) Date of Patent: Aug. 17, 2021

(54) SYSTEM AND METHOD FOR DYNAMICALLY INSTALLING DRIVER DEPENDENCIES

(71) Applicant: DELL PRODUCTS, LP, Round Rock, TX (US)

(72) Inventors: Srikanth Kondapi, Austin, TX (US); Danilo O. Tan, Austin, TX (US); Alexander Kucheravy, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/568,863

(22) Filed: Sep. 12, 2019

(65) Prior Publication Data

US 2021/0081213 A1    Mar. 18, 2021

(51) Int. Cl.
*G06F 9/4401* (2018.01)
*G06F 8/65* (2018.01)
*G06F 8/41* (2018.01)

(52) U.S. Cl.
CPC ............ *G06F 9/4411* (2013.01); *G06F 8/427* (2013.01); *G06F 8/65* (2013.01)

(58) Field of Classification Search
None
See application file for complete search history.

(56) References Cited

U.S. PATENT DOCUMENTS

| | | | |
|---|---|---|---|
| 6,505,258 B1 | 1/2003 | Sakarda et al. | |
| 6,704,864 B1 | 3/2004 | Philyaw | |
| 7,730,295 B1 | 6/2010 | Lee | |
| 8,112,505 B1 | 2/2012 | Ben-Shaul et al. | |
| 8,978,028 B2 | 3/2015 | Flaming et al. | |
| 10,481,892 B2* | 11/2019 | Broghammer | G06F 11/1433 |
| 2003/0204842 A1* | 10/2003 | Chenelle | G06F 15/173 717/177 |
| 2004/0261060 A1* | 12/2004 | Haselden | G06F 8/61 717/120 |
| 2006/0092751 A1* | 5/2006 | Anderson | G06F 9/4411 365/232 |
| 2007/0174833 A1 | 7/2007 | Im | |
| 2007/0234126 A1* | 10/2007 | Lu | G06F 11/3696 714/38.13 |
| 2007/0240147 A1 | 10/2007 | Bernabeu-Auban et al. | |

(Continued)

*Primary Examiner* — Umut Onat
(74) *Attorney, Agent, or Firm* — Larson Newman, LLP

(57) ABSTRACT

A method for deploying dependencies includes determining a first component included in an application package and generating a first driver package for the first component that includes an information file. The method also includes updating the information file to include a dependency of the first component and storing the first driver package to a repository. The first driver package includes first binaries to install the first component. The method further includes downloading the first driver package to an information handling system and determining the dependency of the first component by parsing the information file. If the second component is the dependency, the method determines whether the second component is installed in the information handling system. If the second component is not installed, the method adds the second component to a device manager to trigger a download and installation of a second driver package for the second component.

20 Claims, 4 Drawing Sheets

(56) References Cited

U.S. PATENT DOCUMENTS

| | | |
|---|---|---|
| 2008/0005371 A1 | 1/2008 | Hill et al. |
| 2008/0168477 A1 | 7/2008 | Flegg et al. |
| 2009/0307781 A1 | 12/2009 | Iga et al. |
| 2010/0115145 A1 | 5/2010 | Banerjee et al. |
| 2013/0321268 A1 | 12/2013 | Tuck et al. |
| 2014/0007069 A1 | 1/2014 | Cavalaris et al. |
| 2014/0007073 A1 | 1/2014 | Cavalaris et al. |
| 2014/0085674 A1 | 3/2014 | Hasama |
| 2014/0359602 A1 | 12/2014 | Sawaya et al. |
| 2014/0380340 A1* | 12/2014 | Knichel ............ G06F 8/654 |
| | | 719/327 |
| 2017/0115713 A1 | 4/2017 | Shin et al. |
| 2017/0140306 A1* | 5/2017 | Prabhu ............ G06Q 10/067 |
| 2017/0180778 A1 | 6/2017 | Lee et al. |
| 2017/0315798 A1 | 11/2017 | Shivanna et al. |
| 2017/0329601 A1 | 11/2017 | Morita |
| 2017/0364380 A1 | 12/2017 | Frye, Jr. et al. |
| 2018/0067876 A1 | 3/2018 | Deshpande et al. |
| 2018/0077305 A1 | 3/2018 | Nishio |
| 2018/0192139 A1 | 7/2018 | Deshpande |
| 2018/0276001 A1* | 9/2018 | Roszak ............ G06F 9/4416 |
| 2018/0285554 A1* | 10/2018 | Biswas ............ G06F 9/448 |
| 2018/0321933 A1 | 11/2018 | Kondapi et al. |
| 2019/0205108 A1 | 7/2019 | Anderson et al. |

\* cited by examiner

SYSTEM AND METHOD FOR DYNAMICALLY INSTALLING DRIVER DEPENDENCIES

CROSS REFERENCE TO RELATED APPLICATION

Related subject matter is contained in co-pending U.S. patent application Ser. No. 15/976,454 entitled "Method to Dynamically Create Plug and Play Identifiers in Firmware to Facilitate Deployment of Windows® Services," filed May 10, 2018, the disclosure of which is hereby incorporated by reference.

FIELD OF THE DISCLOSURE

The present disclosure generally relates to information handling systems, and more particularly relates to dynamically installing driver dependencies.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

A method for deploying dependencies includes determining a first component included in an application package and generating a first driver package for the first component that includes an information file. The method also includes updating the information file to include a dependency of the first component and storing the first driver package to a repository. The first driver package includes first binaries to install the first component. The method further includes downloading the first driver package to an information handling system and determining the dependency of the first component by parsing the information file. If the second component is the dependency, the method determines whether the second component is installed in the information handling system. If the second component is not installed, the method adds the second component to a device manager to trigger a download and installation of a second driver package for the second component.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
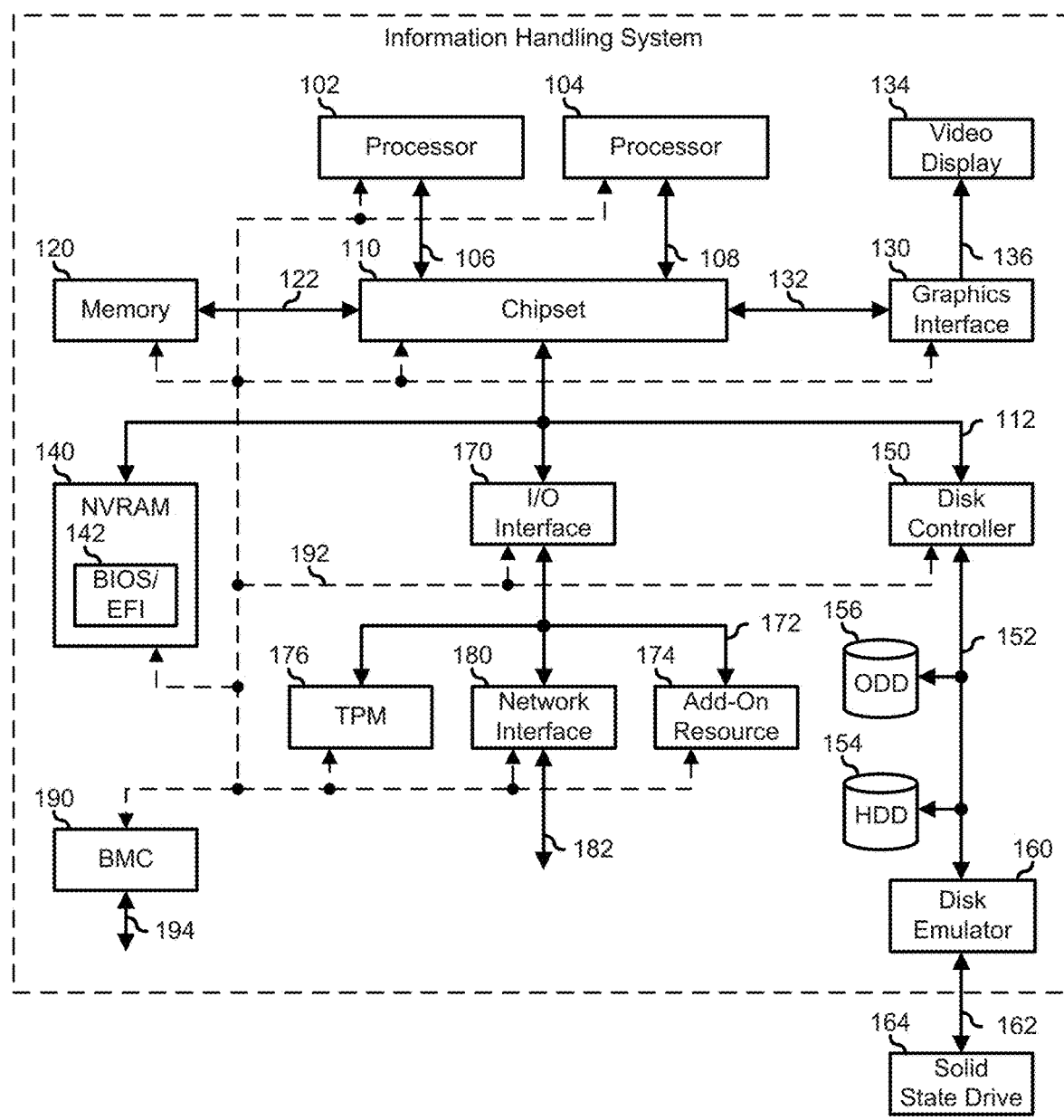
FIG. 1 is a block diagram of a general information handling system, according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132, and provides a video display output 136 to a video display 134. An example of a graphics interface 132 includes a Peripheral Component Interconnect-Express (PCIe) interface and a graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices. In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth® or Bluetooth® Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code. BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC® Remote Access Controller Administrator (RACADM) utility, a Dell EMC OpenManage Server Administrator (OMSS) utility, a Dell EMC® OpenManage Storage Services (OMSS) utility, or a Dell EMC® OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated onto another element of the information handling system such as chipset 110, or another suitable element, as needed or desired. As such, BMC 190 can be part of an integrated circuit or a chipset within information handling system 100. An example of BMC 190 includes an integrated Dell® remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Modern software systems often exhibit a high degree of interdependence, where one piece of software, such as an application, a service, or a device driver is dependent on another piece of application, service or device driver. As used herein, a device driver may also refer to a driver for a service component, a hardware component, and a device. Thus, in order to properly install and run an application, for example, a computer system first installs the application's dependencies, if they are not already installed on the computer system. Dependencies can be transitive, such that a first application may be dependent on a second application which may, in turn, be dependent on a third application. Thus, to install the first application, the computer system first ensures that both the second and the third applications are installed. Dependencies between software can be complex and understanding such dependencies can be a challenge. Because software update services and application stores do not have a mechanism to identify these software dependencies, legacy application deployment packages such as Microsoft® installer (.msi) generally include information and/or ability to understand and manage these dependencies.

Because of the risk of malicious activities, software update services and application stores often impose limits such as restricting the format and type of driver packages they publish, what actions these driver packages can perform, or which APIs these driver packages can use. For example, with the release Windows® 10 in S mode ("Windows®10s"), driver packages need to conform to a specific framework or model such as the kernel-mode driver framework (KMDF), user-mode driver framework (UMDF), and the Windows® driver model (WDM). Further, the driver packages should be deployed via the Window® application store or through the Windows® Update. However, the legacy application deployment packages may not conform to these frameworks and/or models. In addition, the drivers, such as the universal device driver, that conform to the aforementioned frameworks and/or model do not have co-installers and the capability to track their dependencies. Thus, there is a need to generate driver packages that conform to the aforementioned framework and/or model and to provide a system to allow for the management and deployment of device dependencies such as dependent service components, hardware components, devices and services.

Figure 2:
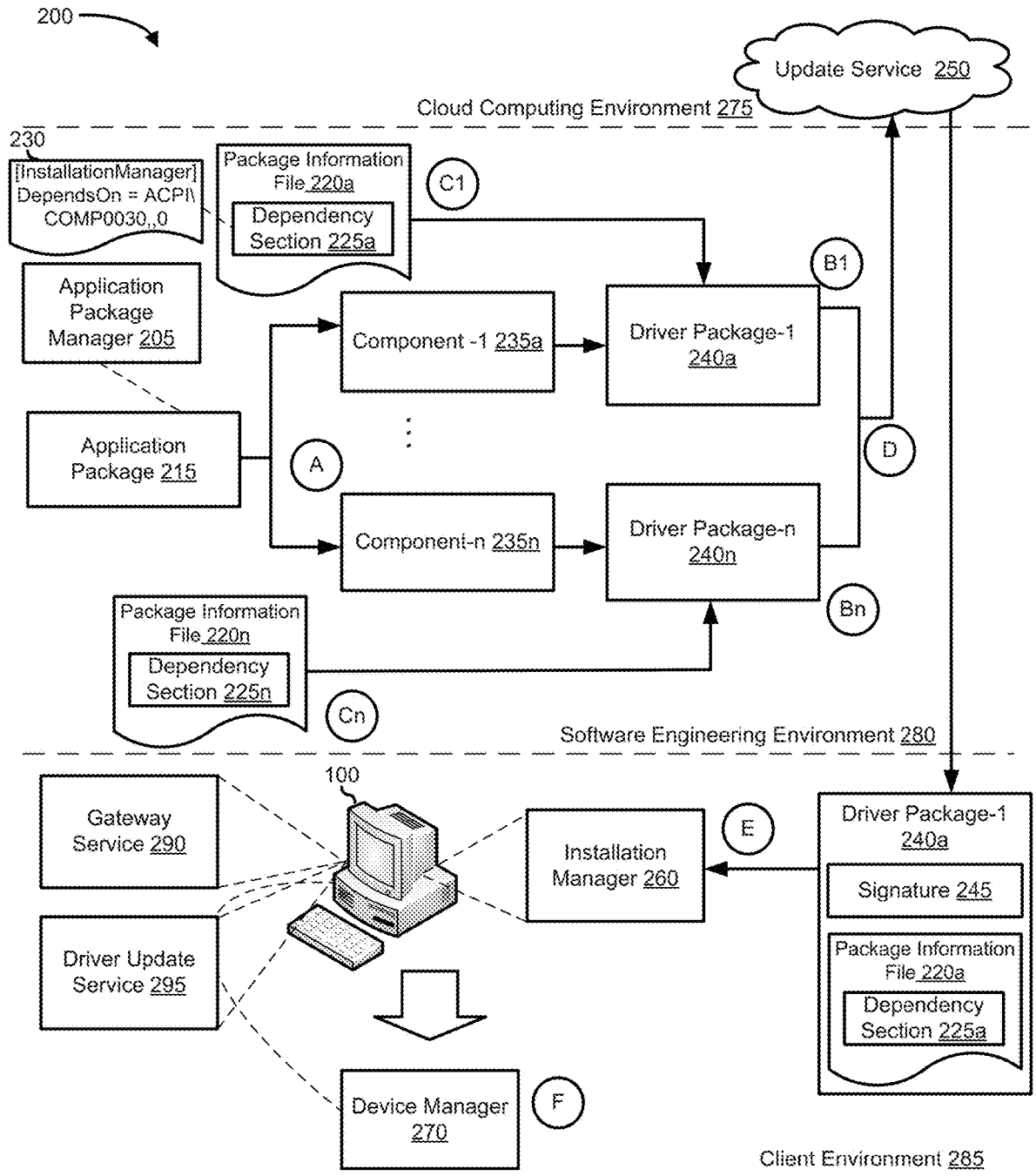
FIG. 2 is a block diagram of a system for dynamically installing driver dependencies, according to at least one embodiment of the present disclosure.

FIG. 2 illustrates a computing system 200 of driver package for deployment to information handling system 100. Computing system 200 includes a cloud computing environment 275, a software engineering environment 280, and a client environment 285.

Software engineering environment 280 may be a factory or assembly plant that manufactures or assembles information handling systems and devices such as an original equipment manufacturer (OEM). Software engineering environment 280 may also be configured to build third-party software including applications and drivers for the information handling systems and its components. Software engineering environment 280 may also be a software development company that distribute their applications via an application store or an update service. Software engineering environment 280 includes an application package manager 205 that may be configured to build driver packages compliant to policies of one or more application stores or driver update services. Application package manager 205 may also be configured to build and manage legacy application packages and/or to re-engineer the Win32 services in the legacy application deployment packages into the driver packages that are compliant with the policies of the of Windows® 10S, such as driver packages 240a-240n.

Driver packages 240a-240n may include binaries and information files, such as package information files 220a-220n. Each package information file may include a component identifier, a location of the driver package, a driver package identifier, a file name, a version number, a vendor name, etc. As used herein a component identifier refers to a service component identifier, a hardware component identifier, or a device identifier. A list of other driver packages, also referred to as dependencies, may also be included in the package information file. The dependencies may be required for the driver update to run properly. For example, a particular version of one driver package may be required to properly update another driver package. In another example, a particular component may be required to be installed prior to installation of a driver. As used herein, a component refers to a service component, a hardware component, or a device.

In various embodiments, an application available through an application store can require a service component to be installed on the system for proper functioning. For example, the application can provide a user interface for configuring subsystems may not have the desired result if the service component is not available to make changes to the operation of the underlying hardware. However, ensuring compatible versions of both the application and the service component are installed can be problematic when splitting the service component and the application providing the user interface. For example, a user may go to the application store and obtain the user interface component and either not follow through or not be aware of the need to install the service component. In another example, the application may receive an update prior to the service component receiving the update. The out of date service component may cause the application to break or may prevent usage of new features of the application until the service component is updated.

Client environment 285 includes information handling system 100 which includes an installation manager 260, a device manager 270, a gateway service 290, and a driver update service 295. Installation manager 260, gateway service 290, and driver update service 295 may be background processes such as a Unix® daemon or a Windows® service also known as a Windows NT® service. Installation manager 260 with gateway service 290, and driver update service 295 may be configured to automate the process of installing, updating, verifying, configuring, and uninstalling the applications, driver packages, and their dependencies. During installation, an application can request a component identifier from the BIOS through gateway service 290. Gateway service 290 is configured to receive a request to enable a component identifier of a component from the application or driver package such as driver package 240a. Gateway service 290 is further configured to enable the component identifier of the device which triggers an update of the driver by driver update service 295. Driver update service 295 includes adding a virtual component or virtual device to device manager 270 by adding a device to device manager 270. When a newer version of the driver is available, driver update service 295 can provide an updated driver to be installed on the information handling system 100. The updated driver may include a firmware update for the component.

Device manager 270 may be configured to manage and keep track of components in information handling system 100 such as to list currently loaded devices and to add and/or remove the devices. Device manager 270 may include information regarding the third-party providers of each component and its resource usage and may also list failed devices and their error codes.

Cloud computing environment 275 may be configured for service delivery of on-demand network access to a shared pool of configurable computing resources such as applications, storage, services, eta. Cloud computing environment 275 includes an update service 250. Update service 250 may include one or more driver package repositories accessible over a network. The network may be a LAN/WAN, including the internet and may utilize any type of connection suitable for data communication including, but not limited to, radio frequency connection, satellite link, and microwave link. Update service 250 may be provided and maintained by an operating system provider such as Microsoft® Application Store, Windows® Update (WU) or Linux® Vendor Firmware Service (LVFS) server.

FIG. 2 is annotated with a series of letters A, B1-Bn, C1-Cn, and D-F. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations. To facilitate description, stages in the current disclosure may be based on a non-limiting .msi standard. However, it will be recognized that essentially the same techniques described below can be applied to other well-known installation standards.

At stage A, application package manager 205 may be configured to determine whether application package 215 is compliant with the limitations imposed by update service 250. For example, if application package manager 205 determines that application package 215 is non-compliant, then application package manager 205 may re-engineer application package 215 to be compliant. Application package 215 may be a legacy application deployment package such as a .msi file.

Typically, legacy application deployment packages are organized into components and/or features. Each component is assigned a globally unique component identifier and maybe a collection of resources, such as a file, a registry key, etc. that are installed or uninstalled as a unit. For example, .msi files may include merge modules that are used to deliver components such as shared code, files, resources, registry entries, and setup logic to applications as a single self-contained file. In this example, because a merge module may include one component, the application package manager 205 may re-engineer application package 215 by generating a driver package for each one of the merge modules or Win32 service included in application package 215. During the re-engineering, application package manager 205 may determine one or more components or devices included in application package 215, such as components 235a-235n based on the merge modules. The application package manager 205 may also determine an inter-dependency among the components. The application package manager 205 may then generate a dependency chain based on the inter-dependency.

At stage B1-Bn, application package manager 205 may then bundle each component into a driver package such as driver packages 240a-240n. As shown, component 235a is bundled into driver package 240a and software component 235n is bundled into driver package 240n. The driver package may be a self-contained executable which can be run on an operating system to install or update the application, firmware, and/or drivers on the information handling system, such as a software driver or a device driver. In addition, the format of the driver package is compliant to the policies of one or more repositories. For example, if the driver package is to be uploaded to the Microsoft® application store or Windows® update, then the driver package is declarative, componentized, hardware support apps, and universal API compliance (DCHU) compliant.

Each driver package includes binaries for the component, a digital certificate, a package information file, etc. The digital certificate or signature may be used to verify the authenticity of the driver package. The package information file is a configuration file for components or applications that includes metadata or information, such as variables, metadata, statements, commands, etc. that may be used during the installation of the driver package. The metadata may also include the component identifier, a version number, release information, a component identifier, etc. This information may be interpreted by an application installer such as installation manager 260 and/or the operating system during installation and/or execution of the driver package.

At stages C1-Cn, application package manager 205 updates each one of package information files 220a-220n to include a list of dependencies. Each driver package includes at least one package information file. The dependencies may include one or more driver packages, components, and/or resources for a successful installation of the driver package. These dependencies may be other than the dependency chain generated in stage A. The package information file may also be updated to include the dependency chain generated in stage A.

The portion of the package information file that includes the list of one or more dependencies is referred herein as a dependency section. Dependency sections 225a-225n may include metadata regarding the dependencies such as a location of each of the dependencies for installation. The location may include a driver package identifier, the component identifier, a version number, the name and location of the service provider or the application store that contains the dependency. An example of dependency section 225a is shown as an example dependency section 230. As shown, component 235a is dependent on another component with a component identifier COMP0030. This other component may be one of components 235a-235n.

At stage D, driver packages 240a-240n are stored in update service 250. Update service 250 is a repository that may be maintained and be made available for remote access of software update management programs such as installation manager 260. The provider of update service 250 may verify the authenticity and digitally sign each driver package prior to its storage.

At stage E, installation manager 260 detects that information handling system 100 needs an update. As used herein, update refers to a software update, a firmware update, and a device driver update. In response to detecting that the information handling system 100 needs an update, installation manager 260 downloads driver package 240a. In other embodiments, a user may initiate the update. Prior to the update, installation manager 260 may perform an inventorying step for the device. Installation manager 260 which it supports and then notify a user which device driver version is installed on the information handling system and which version is present in the driver package. A user can then choose to continue with the device driver update or not.

Prior to the download, installation manager 260 may verify the authenticity of driver package 240a via signature 245. Signature 245 may be a digital signature affixed by the provider of update service 250 after verifying the authenticity of driver package 240a. During the installation of the package, installation manager 260 may proceed to identify whether driver package 240a has a dependency. Installation manager 260 uses dependency section 225a in package information file 220a to identify the dependency.

If driver package 240a has a dependency, then installation manager 260 may then determine whether information handling system 100 currently satisfies the dependency. For example, information handling system 100 satisfies the dependency if information handling system has the dependent device installed. If information handling system 100 satisfies the dependency, then installation manager 260 proceeds to install driver package 240a. Otherwise, installation manager 260 proceeds to stage F. For example, information handling system 100 does not satisfy the dependency if the dependent device is not installed.

At stage F, the application or the driver may be dependent on a component. During installation, the application or the driver requests a component identifier of the component from BIOS through gateway service 290. If the component identifier associated with the component is not installed in the information handling service, then gateway service 290 adds a device node for the component at device manager 270. Adding the device node effectively adds a "virtual device" which "forces" update service 250 to download and install a device driver for the dependency. This repeats until all of the dependencies are satisfied.

The device node may be added in the same hierarchy of the current device node or as a child of the current device node based on one or more factors such as whether the dependency is a shared dependency of other devices or components. After adding the device node, installation manager 260 proceeds to download and install the dependency subject to the verification of its authenticity. In another embodiment, the addition of the device node triggers the installation manager or the update service to download and install the dependency or dependencies. Once the dependencies of driver package 240a are satisfied, installation manager 260 proceeds to install driver package 240a.

Figure 3:
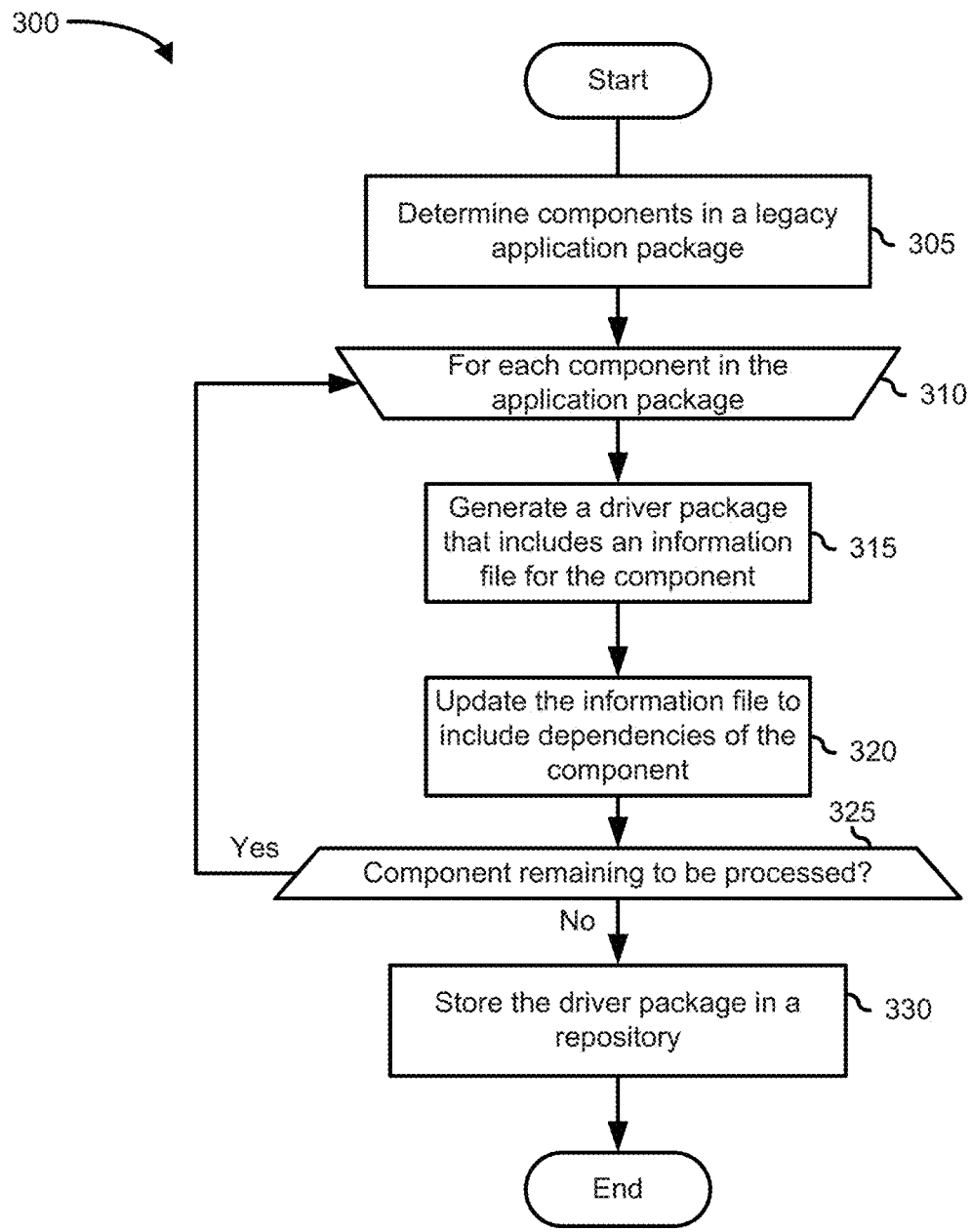
FIG. 3 is a flowchart of a method for determining driver dependencies, according to at least one embodiment of the present disclosure.

FIG. 3 shows a flowchart illustrating a method 300 for re-engineering an application package into various driver packages. Prior to the start of method 300, a determination was made that the application package does not comply with a policy of the repository. Application packages that are non-compliant may need to be re-engineered to be compliant. The method 300 may be performed by an application package manager such as application package manager 205 depicted in FIG. 2.

Method 300 typically begins at block 305. At block 305, the application package manager determines the components in the application package. For example, the application package manager may query a merge module database table to determine the components in the application package. The application package manager may also determine the dependency between the different components in the application package and generate a dependency chain. The method proceeds to block 310.

At block 310, the method begins processing each component in the application package. The method may use a data structure to keep track of the component being processed, such as a list, a table, etc. The component being processed is referred herein as a current component. At block 315, a driver package that is compliant with the policy of the repository is generated for the current component. The driver package may include binaries to install the component and package information file. The package information file includes information regarding the installation of the component. The method proceeds to block 320.

At block 320, the package information file associated with the current component is updated to include dependencies of the current component. For example, a dependency section may be updated or added to the package information file. The dependency section may include a dependency chain with the component identifiers of each dependency. The dependency section may also include other dependencies other than the components in the application package, such as a registry setting. In another embodiment, the package information file may be updated to include a pointer to a data structure that identifies the dependencies. After processing the current component, the method proceeds to block 325.

At block 325, if there is an additional component to be processed, the method proceeds to block 310. Otherwise, the method proceeds to block 330. At block 330, the driver packages are stored in a repository such as an application store or an update service. Prior to the storage, the authenticity of the driver packages may be verified by a provider of the repository based on a digital certificate included with each driver package. In another embodiment, block 330 may be performed prior to processing another component. After storing the driver packages in the repository, the method ends.

Figure 4:
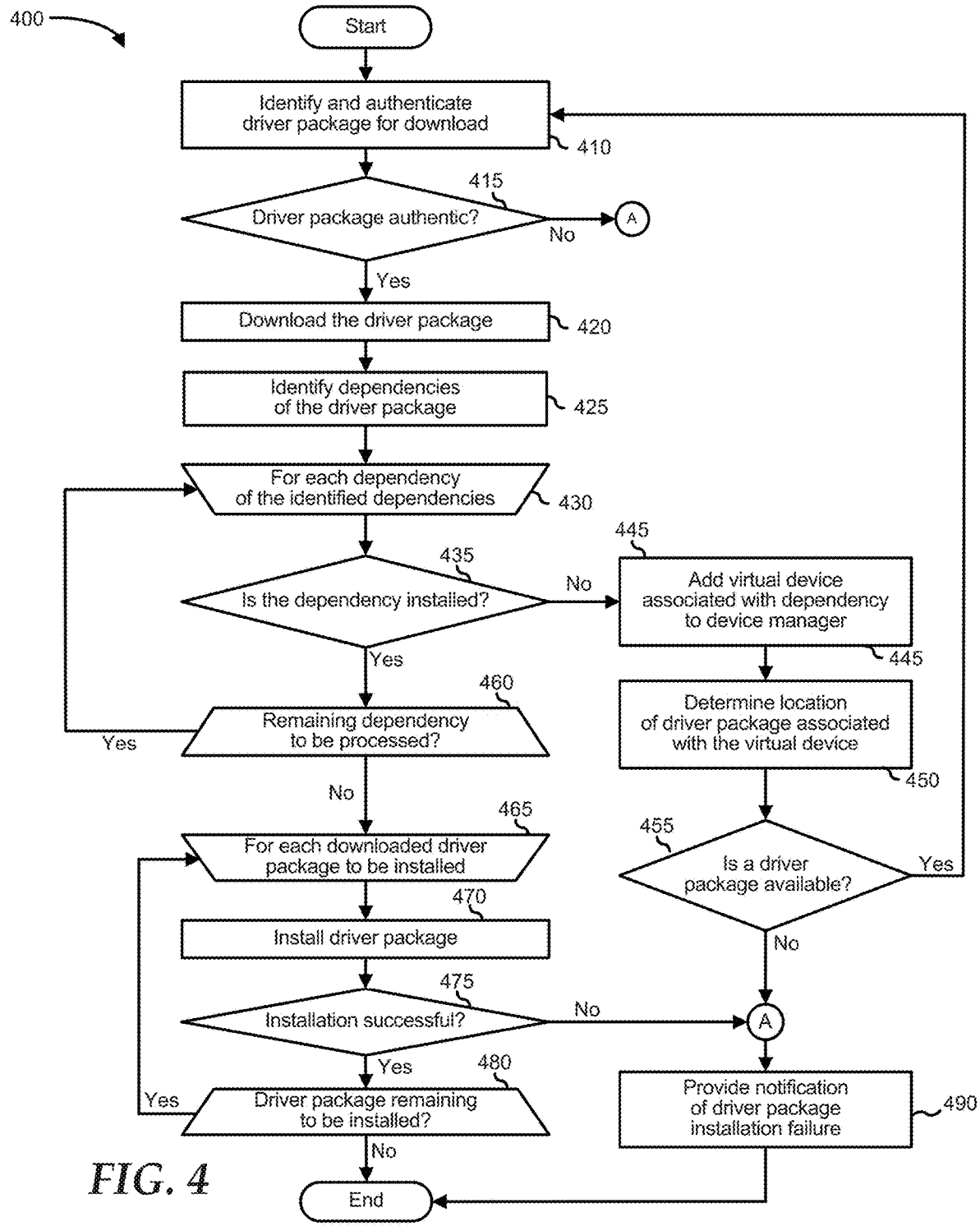
FIG. 4 is a flowchart a method for dynamically installing driver dependencies, according to at least one embodiment of the present disclosure.

FIG. 4 shows a flowchart illustrating a method 400 for installing or updating a component along with its dependencies such as dependent applications, devices and/or services. The method 400 may be performed silently by an information handling system, in particular, the installation manager, gateway service, and/or the device manager depicted in FIG. 2. In another embodiment, the user may perform the one or more blocks or the method 400 or may be prompted by the information handling system.

The method 400 typically begins at block 410. Prior to block 410, the installation manager detects a request for a software update and/or installation of an application. Installation manager can retrieve an application from an online application store and install the application. If the application includes a dependency to a component, the application can transmit a request to enable a component identifier to a gateway service. The gateway service enables the component identifier and triggers the installation of a driver for the enabled component.

At block 410, driver update service detects enabling of a component identifier and/or the addition of a plug-and-play device or a virtual device. Driver update service identifies a driver package associated with the enabled component identifier and/or detected a plug-and-play device or virtual device and locates the associated driver package in a repository. After locating the driver package, the method proceeds to block 415.

At block 415, the driver update service verifies the authenticity of the driver package by validating a digital signature. Typically, the driver package is digitally signed by the provider of the repository. For example, Microsoft® digitally signs a driver package after verifying the authenticity of the publisher. Because a driver package may include one or more source files, an information file, and a catalog file, the provider may sign the catalog file instead of signing each individual file in the driver package. If the signature of the catalog file is valid, then it may be assumed that the driver package is authentic. In another embodiment, each of the individual file in the driver package may be individually signed. If one of the signatures is not valid, then it may be assumed that the driver package is not authentic. If the driver package is authentic, the method proceeds to block 420. Otherwise, the method proceeds to block 490.

At block 420, the driver update service downloads the driver package from the repository. The download may be initiated by the driver update service, Windows® update, an application in the repository, the installation manager, a user, a device driver, a software driver, or an application in the information handling system. The driver package may be an initial installation of the component. The driver package may be an updated version of the driver. After downloading the driver package, the method proceeds to block 425.

At block 425, the gateway service identifies the dependencies of the driver package. For example, the gateway service may parse the package information file included with the driver package. The package information file may include information regarding the dependencies such as a location, vendor, version, an identifier of a driver package, and/or a component of each dependency. A data structure such as a dependency list or chain may be used to keep track of the identified dependencies.

The dependency chain may define or specify a dependency relationship between the various dependencies. The dependency chain may be represented using any data structure, such as a graph, a map, a dependency table, etc. The dependency chain may also include logical statements specifying a relationship between the dependencies and its ordering. The dependency chain may be persisted such as stored in a cache or an internal memory device. After identifying the dependencies, the method proceeds to block 430.

At block 430, the gateway service traverses the dependency chain and processes each dependency. The dependency being processed is referred to as a current dependency. The gateway service may use a flag to keep track of whether the dependency has been processed or not. For example, a flag may initially be set to zero or false and updated to one or true if the dependency has been processed. The method proceeds to block 435.

At block 435, the driver update service determines whether the current dependency is installed and/or updated in the information handling system. For example, the driver update service may query a device manager to determine whether the dependency is installed. In another example, the driver update service checks a registry using the component identifier. If the current dependency is installed and updated then the method proceeds to block 460. If the current dependency is installed but not updated then the method may update the dependency before proceeding to block 460. Otherwise, the method proceeds to block 445. At block 460, if there is another dependency remaining to be processed, then the method proceeds to block 430. Otherwise, the method proceeds to block 465.

At block 445, the gateway service adds the component associated with the dependency on the information handling system by adding a virtual device. The virtual device may be added by creating a device node for the device in the device manager, a plug-and-play manager, or something similar. The device node may include information regarding the component such as a registry entry, the version number, component identifier, etc. After adding the virtual device, the method proceeds to block 450.

At block 450, the gateway service determines an update service, a catalog, or an application store that contains the driver package of the virtual device. The gateway service may make the determination by parsing the package information file. The package information file may include a version number, a name of a source file that contains code for the component, location of the update service, the catalog, or the application store, etc. If the information file does not include the location of the driver package, the gateway service may direct the driver update service to search through online repositories for the driver package. Different repositories may be queried for different driver packages. After determining the location of the driver package, the method proceeds to block 455.

At block 455, the driver update service queries the update service, the catalog, or the application store to determine whether the driver package is currently available for download. If the driver package is available for download then the method proceeds to block 410. Otherwise, the method proceeds to block 490. At block 490, the driver update service provides a notification that the installation of the driver package has failed. After providing the notification, the method ends.

At block 465, the driver update service with the gateway service processes each of the downloaded driver packages. The driver update service may use the dependency chain to keep track of the processing. The driver package being processed is referred to as a current driver package. The driver update service may use a flag to keep track of whether the driver package has been processed, that is installed or not. For example, a flag may initially be set to zero or false if the driver is not installed and then updated to one or true if the driver has been installed. The method proceeds to block 470.

At block 470, the driver update service installs the current driver package. The current driver package may be an initial installation of the component, that is the component has been added to the information handling system. In another embodiment, the driver package may be an update for an existing component. Typically, the driver update service may begin installing the driver package identified at the end of the dependency chain. For example, if driver package A depends on driver package B, and driver package B depends on driver package C, then driver package C is at the end of the dependency chain and is installed first. The driver update service then installs the driver package B and finally the driver package A. After installation of the current driver package, the method proceeds to block 475.

At block 475, the driver update service determines whether the installation of the driver package was successful. If the installation was successful, then the method proceeds to block 480. Otherwise, the method proceeds to block 490. At block 480, the gateway service determines if there is another driver package to be installed. If there is another driver package to be installed, the method proceeds to block 465. Otherwise, the method ends.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein. Also, the term "user" in this context and elsewhere herein is intended to be more broadly construed so as to encompass, for example, human, hardware, software or firmware entities, as well as various combinations of such entities.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

What is claimed is:

1. A method for deploying dependencies, the method comprising:

determining, by a processor, a first component of components included in an application package;

in response to determining to re-engineer the application package to be compliant to an update service policy, generating a driver package for each one of the components that includes a first driver package for the first component in the application package and a second driver package for a second component, wherein the driver package includes an information file;

subsequent to determining inter-dependencies among the components, updating the information file to include a dependency chain for the components, wherein the dependency chain describes a dependency of the first component is to the second component;

storing the first driver package to a repository, wherein the first driver package further includes first binaries to install the first component, and wherein the information file with the dependency chain includes a component identifier for each of the dependencies in the dependency chain;

downloading the first driver package to an information handling system;

determining the dependency of the first component by parsing the information file;

in response to determining that the second component is the dependency, determining whether the second component is installed in the information handling system; and in response to determining that the second component is not installed, adding the second component to a device manager of the information handling system by adding a device node associated with the second component that triggers a download and an installation of the second driver package respective to the second component.

2. The method of claim 1, wherein the determining the first component included in the application package is based on identifying a merge module included in the application package.

3. The method of claim 1, wherein the determining whether the second component is installed includes requesting a component identifier from a basic input/output system through a gateway service.

4. The method of claim 1, wherein the adding the second component to the device manager is performed by a gateway service.

5. The method of claim 1, wherein the first driver package is compliant with a policy of the repository.

6. The method of claim 1, further comprising generating the dependency chain based on the dependency of the first component.

7. The method of claim 6, wherein the dependency chain includes a third component.

8. The method of claim 1, further comprising verifying authenticity of the second driver package prior to the downloading of the second driver package.

9. The method of claim 1, further comprising determining that the second component is not installed prior to adding of a virtual device.

10. A method for deploying dependencies, the method comprising:
determining, by a processor, a first device and a second device of devices included in an application package;
in response to determining to re-engineer the application package to be compliant to an update service policy, generating a driver package for each one of the devices that includes a first driver package and a second driver package, wherein the first driver package includes a first information file and first binaries to install a first device driver, and wherein the second driver package includes a second information file and second binaries to install a second device driver;
subsequent to determining inter-dependencies between the first device and the second device, generating a dependency chain that describes that the second device is a dependency of the first device;
updating the first information file to include the dependency chain;
storing the first driver package and the second driver package in a repository, wherein the first information file with the dependency chain includes a component identifier for each of the dependencies in the dependency chain;
downloading the first driver package to an information handling system and installing the first device driver to the information handling system;
determining that the second device is the dependency of the first device by parsing the dependency chain included in the first information file;
determining whether the second device is installed in the information handling system; and
in response to the determining that the second device is not installed in the information handling system, adding a device node associated with the second device to a device manager of the information handling system that triggers a download of the second driver package respective to the second device and installation of the second device driver, wherein the device node is added based on a hierarchy between the first device and the second device.

11. The method of claim 10, wherein the determining whether the second device is installed in the information handling system includes querying a basic input/output system through a gateway service.

12. The method of claim 10, wherein the first information file includes other dependencies of the first device.

13. The method of claim 12, further comprising determining whether the information handling system includes the other dependencies of the first device.

14. The method of claim 10, further comprising querying the repository to determine whether the second driver package is available for the download.

15. The method of claim 10, further comprising verifying authenticity of the second driver package prior to the download of the second device driver package.

16. An information handling system comprising:
a plurality of processors; and
a memory having code stored thereon that, when executed by one of the processors, performs a method including:
determining a first device and a second device of devices included in an application package;
in response to determining to re-engineer the application package to be compliant to a policy of an update service, generating a first driver package based on the first device and a second driver package based on the second device;
subsequent to determining inter-dependencies among the devices, generating a dependency chain that describes a dependency of the first device is to the second device;
downloading the first driver package that includes binaries to install the first device, wherein the first driver package includes a first information file with the dependency chain that includes a device identifier for each dependency in the dependency chain;
determining the dependency of the first device by parsing the first information file associated with the first driver package, vs/herein the dependency is the second device;
determining whether the second device is installed in the information handling system; and
in response to the determining that the second device is not installed in the information handling system:
adding a device node for the second device in the information handling system, wherein the device node is added based on a hierarchy between the first device and the second device;
downloading the second driver package that includes binaries to install the second device, wherein the downloading is triggered by the adding the device node for the second device; and installing the device node prior to installing the second device.

17. The information handling system of claim 16, wherein the determining the dependency of the first device is based on the dependency chain.

18. The information handling system of claim 16, wherein the first driver package is a universal Windows® driver.

19. The information handling system of claim 16, wherein the memory having code stored thereon, when executed by one of the processors, performs the method further comprising determining a repository of the second driver package.

20. The information handling system of claim 16, wherein the memory having code stored thereon, when executed by one of the processors, performs the method further comprising determining authenticity of the second driver package prior to the downloading the second driver package.

\* \* \* \* \*